United States Patent
Tonelli

(10) Patent No.: US 8,863,374 B2
(45) Date of Patent: Oct. 21, 2014

(54) PRODUCTION PLANT, PARTICULARLY FOR SUITCASES AND TRUNKS

(75) Inventor: Massimo Tonelli, Casalecchio di Reno (IT)

(73) Assignee: G.T. Line S.r.l., Crespellano, Bologna (IT)

( * ) Notice: Subject to any disclaimer, the term of this patent is extended or adjusted under 35 U.S.C. 154(b) by 1155 days.

(21) Appl. No.: 12/662,094

(22) Filed: Mar. 31, 2010

(65) Prior Publication Data

US 2010/0198388 A1     Aug. 5, 2010

(51) Int. Cl.
*B23P 19/00*     (2006.01)
*A45C 5/02*     (2006.01)
*B23P 21/00*     (2006.01)
*A45C 5/00*     (2006.01)

(52) U.S. Cl.
CPC .............. *A45C 5/02* (2013.01); *B23P 21/004* (2013.01); *A45C 5/00* (2013.01); *Y10S 901/08* (2013.01); *Y10S 901/31* (2013.01)
USPC .................. 29/791; 29/430; 29/428; 29/592; 29/700; 29/784; 700/110; 700/114; 700/117; 700/214; 700/248; 901/8; 901/31

(58) Field of Classification Search
USPC ........... 29/429, 430, 431, 783, 791, 822, 824, 29/711, 700, 799, 801, 650; 700/110, 114, 700/117, 214, 217, 231, 245, 248; 901/31, 901/8
See application file for complete search history.

(56) References Cited

U.S. PATENT DOCUMENTS

| | | | |
|---|---|---|---|
| 3,332,136 A * | 7/1967 | Bish et al. ...................... 29/413 |
| 5,228,546 A | 7/1993 | Chang et al. | |
| 6,056,527 A * | 5/2000 | Bunyan et al. ............... 425/113 |
| 6,612,011 B2 * | 9/2003 | Mayr et al. ..................... 29/430 |
| 6,899,377 B2 * | 5/2005 | Ghuman et al. .......... 296/181.1 |
| 7,076,865 B2 * | 7/2006 | Morbitzer et al. .............. 29/799 |

FOREIGN PATENT DOCUMENTS

GB      2275 224 A      8/1994

* cited by examiner

*Primary Examiner* — Peter DungBa Vo
*Assistant Examiner* — Azm Parvez
(74) *Attorney, Agent, or Firm* — Modiano & Associati; Daniel J. O'Byrne

(57) ABSTRACT

A production plant, particularly for suitcases and trunks, such suitcases and trunks comprising at least two half-shells mutually associated so as to form at least one internal containment compartment. The plant comprises: at least one station for loading at least one half-shell; at least one work island which has at least one dispenser of perimetric gasket seals; at least one storage area for the half-shells; at least one center for mating the half-shells, so as to form substantially the finished product, such as a suitcase and a trunk; at least one station for unloading the finished product.

10 Claims, 2 Drawing Sheets

PRODUCTION PLANT, PARTICULARLY FOR SUITCASES AND TRUNKS

The present invention refers to a production plant, particularly for suitcases, trunks and the like.

BACKGROUND OF THE INVENTION

Nowadays, the ever-increasing competition that is being seen in all sectors is leading companies to seek out ever newer solutions in order to launch products on the market that are capable of meeting the increasingly demanding requirements of consumers, while at the same time maintaining a high qualitative standard and low costs.

In such context, a company finds itself faced with the necessity of reviewing its internal processes, in order to salvage or increase competitiveness, also by means of a reduction of its logistics and production costs, which are often determining factors in the formation of the definitive cost of the product (consider, for example, the incidence of labour costs).

More precisely, a company that wants to offer a product such as a professional briefcase or a suitcase must be capable of providing a high degree of customisation for objects that, in and of themselves, comprise a large number of elements in their bills of materials.

At the same time, such briefcases and suitcases, and the half-shells that comprise them, must offer guarantees in terms of seal-tightness and impact strength, as well as in general must feature a design that is pleasing and attractive.

As previously observed, all these particularities must coexist in a product with a low retail price, in order to not risk offering a product that is certainly high-performing but too expensive for the spending power of consumers.

Until now, the production of such objects, and more specifically the assembly of the shells and the fitting of the other parts, has been achieved by means of manual activities, which are necessary to ensure observance of the aforementioned qualitative constraints and the desired customisation of the finished product.

Such a solution, owing to the costs that it involves, currently presents evident drawbacks that cause companies to view the profit that can be earned from the presence in such markets as being increasingly reduced.

SUMMARY OF THE INVENTION

The aim of the present invention is to solve the aforementioned drawbacks, by devising a production plant that makes it possible to optimise the process of producing briefcases, suitcases and the like, resulting in a reduction in logistics costs and in the costs associated with labour.

Within this aim, an object of the invention is to devise a production plant that enables an at least partial automation of the production process.

Another object of the invention is to devise a production plant that makes it possible to reduce the set up and adjustment times that are normally required when there is a change in the format of the products being processed.

A further object of the invention is to devise a production plant that ensures a high level of reliability in operation.

Another object of the invention is to devise a production plant that can be easily made from elements and materials that are readily available on the market.

This aim and these and other objects which will become better apparent hereinafter are achieved by a production plant, particularly for suitcases, trunks and the like, such suitcases and trunks comprising at least two half-shells mutually associated so as to form at least one internal containment compartment, characterized in that it comprises: at least one station for loading at least one half-shell; at least one work island which has at least one dispenser of perimetric gasket seals; at least one storage area for said half-shells; at least one centre for mating said half-shells, so as to form substantially the finished product, such as a suitcase, trunk or the like; and at least one station for unloading said finished product.

BRIEF DESCRIPTION OF THE DRAWINGS

Further characteristics and advantages of the invention will become better apparent from the following detailed description of two preferred, but not exclusive, embodiments of the production plant according to the invention, illustrated by way of non-limiting example in the accompanying drawings, wherein.

DESCRIPTION OF THE PREFERRED EMBODIMENTS

Figure 1:
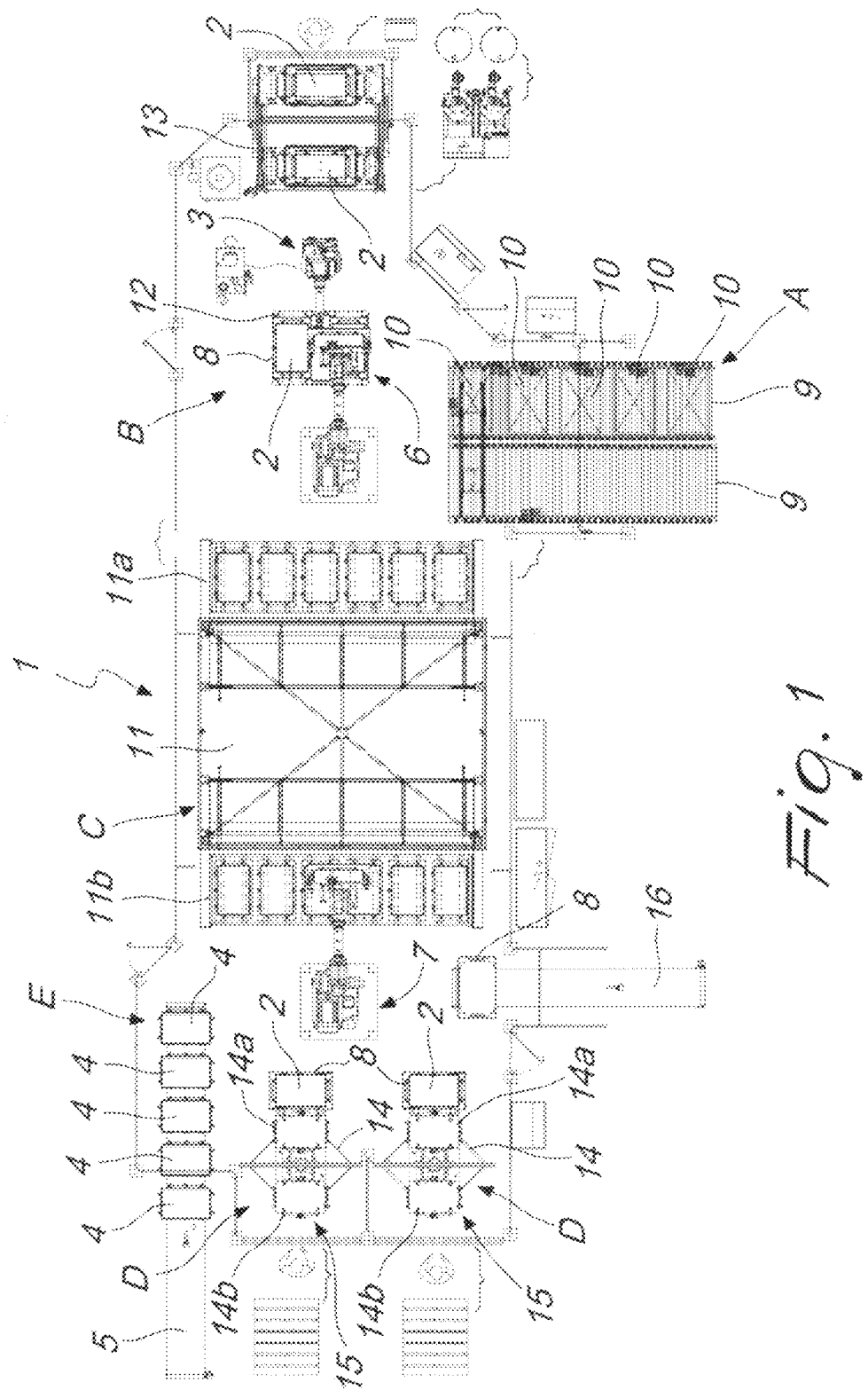
FIG. 1 is a plan view of the production plant according to the invention, in a first embodiment thereof.

With reference to the figures, a plant according to the invention, generally designated by the reference numeral 1, is adapted to produce objects such as suitcases, trunks and the like, comprising at least two half-shells 2 mutually associated so as to form at least one internal containment compartment.

The types of aforementioned objects, to which reference will be made in the course of the present description, constitute the preferred, but not exclusive, field of application of the plant 1 according to the invention.

Different uses of the plant 1, for different types of production which have particularities such as to allow, and to make corporately advantageous, the use of the production pattern described and claimed herein, are not excluded.

According to the invention, the plant 1 comprises at least one station A for loading at least one half-shell 2; the half-shells 2 can for example be made previously by moulding and then made available at the entry point of the loading station A.

In order to constitute a reserve of semi-processed stock necessary to ensure continuity of production, it is possible to store the half-shells 2 in an area adjacent to the loading station A.

The plant 1 further comprises at least one work island B which in turn has at least one dispenser 3 of perimetric gasket seals.

Such gasket seals, laid by the dispenser 3 along the edge of at least one of the two half-shells 2 to be mated, ensure the seal-tightness of the suitcase or of the trunk, and adapt it for use even in environments exposed to atmospheric agents or to the danger of contact with liquids of various nature.

According to one possible and non-limiting embodiment of particular practical interest of the application of the invention, the gasket seals are constituted by a cordon of polymeric material (for example polyurethane) to be placed along the edge of the half-shells 2, in which a suitable groove to receive it is provided.

Once positioned, the gasket seal must enter a period of maturation for its consolidation and full solidification, a phase that also results in an increase in volume, thus causing it to press against, and therefore securely adhere to, the groove in which it is accommodated.

The plant 1 also comprises an area C for storage of the half-shells 2, whether they are fitted with the gasket seal (according to the preferred applicative solution) or not.

It is in the storage area C that the gasket seals enter the aforementioned maturation period; the subsequent phases of the production process can be executed only when the consolidation has finished.

In addition, the plant 1 comprises a centre D for mating the half-shells 2, so as to form substantially the finished product 4 which is, as has been said above, of the type of a suitcase, a trunk or the like.

The finished products 4 can be evacuated by an unloading station E, for example by means of a conveyor belt 5, and in this way be made available for possible packaging operations and hence for sale or for storage in a final warehouse.

Advantageously, the plant 1 comprises at least one grip robot 6, substantially of the anthropomorphic type, capable of moving the half-shells 2, to pick them up from the loading station A and set them down at the work island B, so that the gasket seals can be laid on them.

The first grip robot 6 can subsequently pick up the half-shells 2 from the work island B and set them down in the storage area C.

To avoid the necessity of using a device that is excessively complex and cumbersome, the loading station A, the work island B and the storage area C are arranged in mutual proximity, and, as can be seen from the enclosed figures, the first grip robot 6 occupies substantially the central region of the surface affected by such apparatuses.

In this way the length of the paths required for the half-shells 2 is reduced to the minimum, ensuring an optimisation of costs and of the associated time losses, as well as making it possible to adopt a first grip robot 6 that is structurally simpler and smaller in size.

Similarly to what is mentioned above regarding the first grip robot 6, the plant 1 also comprises a second grip robot 7, adapted to move half-shells 2 and also of the anthropomorphic type.

The second grip robot 7 picks up the half-shells 2 from the storage area C and sets them down at the mating centre D, and in addition it is able to pick them up from the mating centre D and set them down at the unloading station E, from where they are evacuated.

In addition, the storage area C, the mating centre D and the unloading station E are also mutually proximate, and the second grip robot 7 is located substantially in the middle of them, thus ensuring the same advantages noted for the first grip robot 6 and the apparatuses adjacent to it.

To devise the removable gripping of the half-shells 2, and their subsequent movement, the first grip robot 6 and the second grip robot 7 respectively comprise a first grip element and a second grip element, for example of the type that simulates a hand, the use of which is widespread on various types of manipulator.

Usefully, such first grip element and such second grip element are adapted to grip a containment tray 8 of half-shells 2, for example thermoformed, which comprises at least one seat, the shape and dimensions of which are complementary to those of the half-shell 2 for its stable accommodation.

The design choice to provide the gripping of the trays 8, in particular externally along their sides, rather than the direct gripping of the half-shells 2, allows the handling and movement of half-shells 2 that have different dimensions, without requiring modifications to the configuration of the various elements of the plant 1.

Indeed, it is sufficient to define a standard (single) shape for the tray 8, with which the first grip robot 6, the second grip robot 7 and the other apparatuses of the plant 1 can interact, in order to allow the feeding of the tray 8 with different models of half-shells 2.

Such different models are accommodated in seats that have different shapes and dimensions provided in the trays 8: with the varying of the production batch it is sufficient to choose one or more trays 8 fitted with the corresponding seat, but having the same external dimensional characteristics, for which the first grip robot 6 and the second grip robot 7 are dimensioned and on which such robots operate.

It should be noted that, depending on the dimensions and on the bulk of the half-shell 2, a plurality of seats can be provided on the tray 8, for optimising the number of trays 8 necessary and the space occupied by them.

For example, according to an embodiment of particular practical interest, a single tray 8 can accommodate up to six half-shells 2, in the case of the smallest models.

In order to ensure the movement of the finished products 4, which can no longer be accommodated in the trays 8 designed to accommodate only the half-shells 2, the second grip element comprises an auxiliary element for retaining the half-shells 2.

Such element, by operating directly on the wall of the half-shells 2, and not on the sides of the tray 8, thus ensures the possibility of picking up, as explained above, the finished products 4 from the mating centre D and setting them down at the unloading station E.

Advantageously, the loading station A comprises at least one movable platform 9 that is capable of moving pallets 10 that are adapted to support the trays 8, and which are made in such a way as to be stackable one above the other (for example up to ten), even with the half-shells 2 accommodated in the seats formed in them.

More specifically, as can be seen from the accompanying drawings, the plant 1 has a pair of movable platforms 9 arranged side by side: the end portion of a first feeding platform faces the first grip robot 6. Then, at such end portion, the first robot 6 can pick up the tray 8 lying on the top of the stack carried by the pallet 10; such operation is repeated until there are no more trays 8 present on the pallet 10.

Subsequently, the pallet 10 can be automatically transferred to the second movable platform 9, which will take care of its evacuation.

Advisably, the loading station A has at least one reader, provided along the movable platform 9, of a transponder that can be fixed to the pallets 10 (or, according to a different possible embodiment, directly to the trays 8).

Such reader can be for example located beside the movable platform 9 to acquire identification data of the transported trays 8 and of the half-shells 2 contained in them and to transmit such data to a control and management unit, which can be operatively associated with the dispenser 3 and/or with the storage area C.

The presence of such control and management unit makes it possible to automate the operations subsequent to loading the pallets 10: once such information has been acquired, the control and management unit can set all the subsequent phases for the processing of the specific model of the half-shell 2.

For example, the dispenser 3 can handle the positioning of the gasket seals by accessing a virtual memory, previously loaded, to obtain the information necessary for the execution of the correct path to take, which is variable depending on the edge and the groove, and therefore depending on the different models of half-shells 2.

After this, the half-shells 2 carried by the trays 8 can be set down by the first grip robot 6 at the storage area C, which comprises an automatic magazine 11 for storing the trays 8 in predefined allocation compartments.

The automatic magazine 11 comprises automatic means for moving the trays 8 from a loading platform 11a, which faces the work island B, to the aforementioned allocation compartments, and from these to an unloading platform 11b, which faces the mating centre D.

Such automatic movement means, for example comprising one or more rack feeders, can be controlled by the control and management unit. In this way the identification data, as well as the information on the gasket seal and on the maturation period, are available for each tray 8, and for each half-shell 2, stored in the allocation compartments.

Thus the control and management unit will make available, for the subsequent phases, only those half-shells 2 for which such period has concluded.

It should be noted how the choice to use a single format for the containment trays 8 makes it possible to optimise the management of the spaces necessary for storing the half-shells 2 inside the storage area C.

Usefully, to allow the laying of the gasket seal, the work island B comprises at least one main worktable 12, which is controlled by the dispenser 3. The main worktable 12 has suitable abutments for the automatic centring of the trays 8, moved by the first grip robot 6.

Again, it appears evident here how the choice to use trays 8 of a standard format allows the use of the main worktable 12 without resorting to adjustments of longer or shorter duration with the varying of the format of the half-shells 2 handled.

The abutments present on the main worktable 12 are dimensioned and positioned according to references (such as, for example, pins) defined along the (standard) sides of the trays 8: the centring is therefore ensured, independently of the model of the half-shells 2 being processed.

The work island B also comprises at least one auxiliary worktable 13, which is also controlled by the dispenser 3: at least one section of the auxiliary worktable 13 is movable in order to allow the offline loading of the half-shells 2 and their subsequent transfer proximately to the dispenser 3 for the positioning of the gasket seal.

The auxiliary worktable 13 constitutes a second feeding line, which is particularly useful in the event of system blockages or for handling extremely small batches, and it also makes it possible to manage models of half-shells 2 that may have dimensions which are incompatible with the tray 8 previously described.

If the production of a batch of suitcases or trunks that are particularly bulky is required, the dimensions of which exceed those of the finished products 4 handled normally for which the tray 8 has been dimensioned, production is still ensured by means of the auxiliary worktable 13.

On the auxiliary worktable 13, and in particular on its movable section, an operator can load the half-shell 2 and position it by means of suitable templates made previously, which make it possible to replicate the centring otherwise achieved by means of the aforementioned abutments.

After having loaded the half-shells 2 onto the auxiliary worktable 13, it is possible to proceed, as already explained, with the dispensing and positioning of the gasket seal.

Subsequently, the half-shells 2 that have dimensions larger than those for which the storage area C and the trays 8 have been dimensioned, can be manually evacuated from the system and handled separately.

Advantageously, the plant 1 according to the invention comprises two centres D, each of which is adapted to mate the half-shells 2; in addition, each centre is equipped with the equipment necessary for fitting the other components that define the finished product 4.

Such other equipment makes it possible to perform, for example, the insertion of the pins of the handles, the insertion of the valve, and the insertion of the pins of the hinges.

The two centres D are arranged side by side and both can be served by the second grip robot 7 both for the operation of only one of them, and for the operation of both in parallel, in which case they are fed alternately, such operation making it possible to ensure a higher level of productivity.

More particularly, each centre D comprises a turntable 14 with manual activation that has at least two sectors 14a, 14b adapted to temporarily accommodate the half-shell 2 carried by the tray 8.

With the turntable 14 motionless, one of the sectors 14a, 14b faces the second grip robot 7, while the other sector 14b, 14a faces a manual assembly station 15, fitted out with the equipment, for example of the pneumatic type, necessary for the assembly of the half-shells 2 and for the fitting of the other components.

The operator, at the manual assembly station 15, can thus perform the mating of two half-shells 2, one of which, fitted with a gasket seal and accommodated in the tray 8, is supplied by the turntable 14, while the other can be for example stored in the vicinity of the centre D.

Simultaneously, the second grip robot 7 picks up, from the sector 14b, 14a facing it, the finished product 4 made by the operator in the previous cycle, unloads the empty tray 8 (on a pallet 10 placed proximately and subsequently evacuated by means of an unloading platform 16) and finally loads a new tray 8 and therefore at least one new half-shell 2 for the subsequent cycle.

At the end of the operations required, the operator can start the rotation of the turntable 14 and in this way make available, to the second grip robot 7, a new finished product 4 to be unloaded, while the operator prepares for the mating of a new pair of half-shells 2.

Obviously, if the tray 8 has a number of seats that is greater than one, then the picking-up from the storage area and the unloading of the tray 8 are not executed for each cycle, but only when there are no more half-shells 2 contained in it.

It should be noted how this phase, unlike those illustrated above concerning the dispensing of the gasket seal, is commanded and cadenced directly by the operator, who, by means of the impulses sent to the turntable 14, sets the rhythm of production.

The storage area C is therefore configured as a decoupling point between the activities performed upstream of them, which are completely automated, and the activities performed downstream, where it is the operator acting at the manual assembly station 15 who substantially defines the cycle time.

However, applications of the present invention that require the use of mating centres C that are completely automated are not excluded, for example by means of using a plurality of workstations arranged in a circle and with sequential dependency: the presence of the operator in this case may be necessary only for some activities involving finishing and/or for checking and feeding the line.

Figure 2:
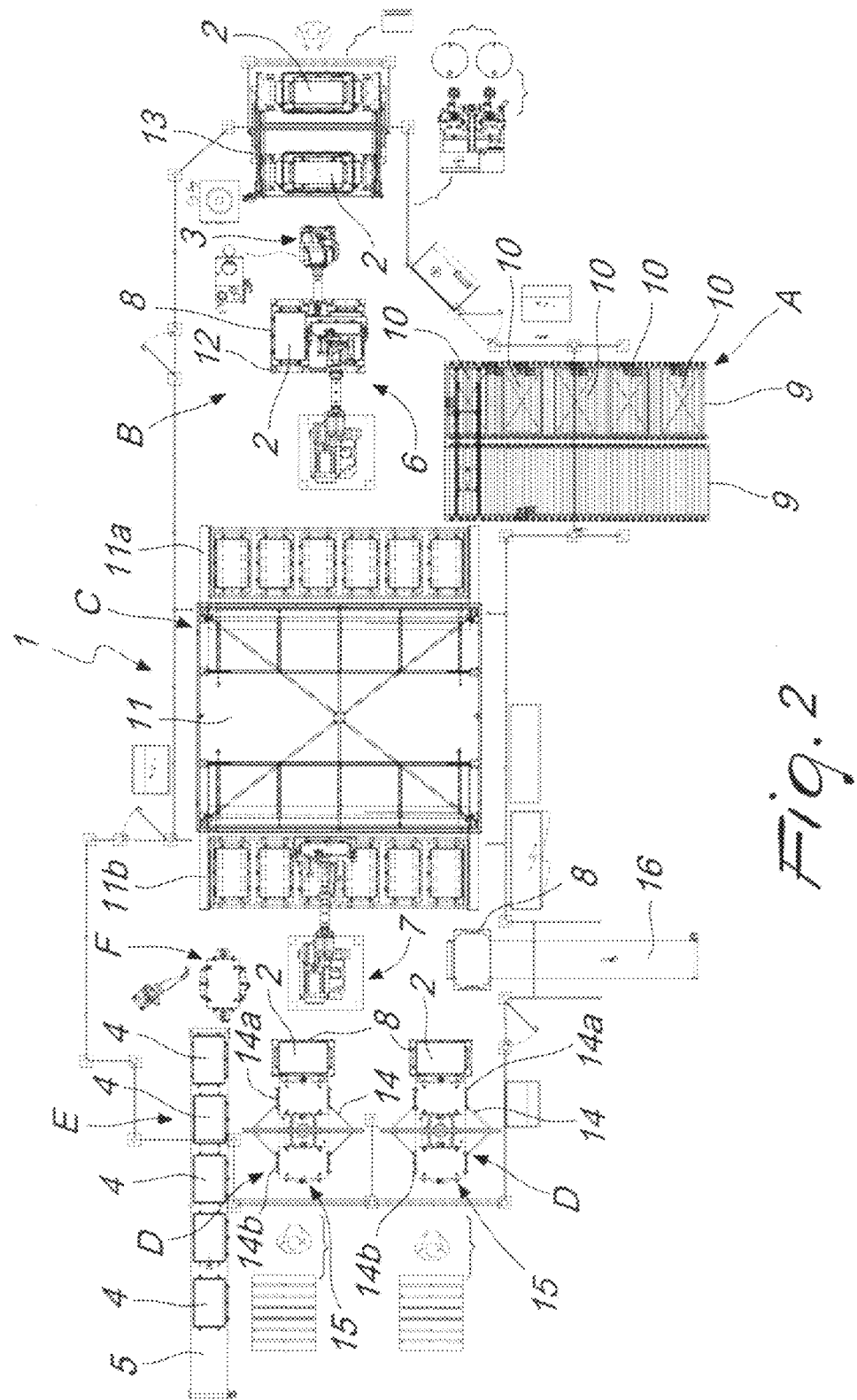
FIG. 2 is a plan view of the production plant according to the invention, in a second embodiment thereof.

Conveniently, as shown in FIG. 2, the plant 1 according to the invention comprises, downstream of the mating centres D, a unit F for verifying the presence of the components on the finished product 4.

In the verification unit F there may be for example feeler probes, laser or ultrasound readers, video cameras or other instruments adapted to verify the presence of the components mentioned above, in order to ensure the dispatch to the unloading station E of a finished product 4 that conforms to requirements.

The operation of the plant according to the invention is as follows.

Once the half-shells 2, contained in the trays 8 which in turn are stacked on the pallets 10, are made available in the vicinity of the loading station A, the pallets 10 are placed on the first feeding movable platform 9, which brings them near to the first grip robot 6.

The first grip robot 6 grips the tray 8 lying on the top of the stack and sets it down at the main worktable 12, where the dispenser 3, located at the work island B, lays a gasket seal in the groove in the half-shell 2.

As can be seen, the dispenser 3 can also operate on the auxiliary worktable 13 which is fed manually and offline, to compensate for possible breakdowns or malfunctioning of the system or to process batches of finished products 4 that are limited in size and/or non-standard.

Once the gasket seal is laid, the first grip robot 6 again picks up the tray 8, in a standard format and therefore independent of the model of half-shell 2, so as to avoid setting-up and adjustment.

The tray 8 is thus set down at the storage area C, in which the maturation period necessary for the consolidation of the polymeric material constituting the gasket seal is observed.

The information about the trays 8, their position and their contents are acquired and governed by a control and management unit, which makes possible the complete automation of the activities as described.

Once the maturation period is concluded, the half-shell 2 on which the gasket seal has been laid is available for the subsequent processing phases and can therefore be picked up, still accommodated in the container, by the second grip robot 7 and set down on one of the sectors 14a, 14b of the turntable 14 in one of the two mating centres D.

The turntable 14 can thus rotate to offer the sector 14a, 14b to a manual assembly station 15 where an operator can mate the half-shell 2 with another half-shell 2 (stored in the vicinity) and can fit the other components.

In the meantime, the second grip robot 7 can set down a new tray 8 on the other sector 14b, 14a, necessary for the subsequent work cycle (as already noted, if the tray 8 accommodates a plurality of half-shells 2, then this operation is executed only when these run out).

At the end of the operations described above, the operator manually activates the rotation of the turntable 14, to receive the new half-shell 2 to be mated, and to deliver, to the second grip robot 7, the finished product 4, which is set down by the second grip robot 7 at the unloading station E (possibly after a check in the verification unit F for the presence of the components and for the correct mating), while the empty tray 6 is set down on the unloading platform 16.

In practice it has been found that the plant according to the invention fully achieves the intended aim and objects, in that the choice to use a station for loading the half-shells to be mated, proximately to a work island equipped with a dispenser of gasket seals, in turn proximate to a storage area for the half-shells, as well as the presence of the centre for mating the half-shells and of the unloading station in the vicinity of such storage area makes it possible to optimise the process of producing briefcases, suitcases and the like, resulting in a reduction in logistics costs and in the costs associated with labour.

The plant thus conceived is susceptible of numerous modifications and variations, all of which are within the scope of the appended claims; in addition, all the details may be replaced by other technically equivalent elements.

In the exemplary embodiments illustrated, individual characteristics given in relation to specific examples may actually be interchanged with other different characteristics existing in other exemplary embodiments.

In addition, it should be noted that anything found to be already known during the patenting process is understood not to be claimed and to be the subject of a disclaimer.

In practice the materials employed, as well as the dimensions, may be any according to requirements and to the state of the art.

What is claimed is:

1. A production plant for producing a product comprising at least two half-shells mutually associated so as to form at least one internal containment compartment, comprising:
    at least one loading station for loading at least one half-shell;
    at least one work island, which has at least one dispenser of perimetric gasket seals that are suitable to ensure seal-tightness of the product that comprises at least two half-shells;
    at least one storage area for half-shells;
    at least one first grip robot for picking up at least one half-shell from said loading station and delivering the at least one half-shell to said work island and for removal thereof from said work island and delivery to said storage area, said loading station, said work island and said storage area being mutually proximate;
    at least one mating centre for mating half-shells, so as to form the product that comprises the at least two half-shells mutually associated;
    at least one unloading station for unloading the product; and
    at least one second grip robot for picking up the at least one half-shell from said storage area and delivering it to said mating centre and for removal from said mating centre and delivery to said unloading station, said storage area, said mating centre and said unloading station being mutually proximate.

2. The plant according to claim 1, wherein said first grip robot and said second grip robot comprise respectively a first grip element and a second grip element, for detachable gripping and movement of trays for containing the at least one half-shell, the trays comprising at least one seat the shape and dimensions of which are complementary to those of the half-shell for its stable accommodation.

3. The plant according to claim 2, wherein said second grip element comprises an auxiliary element for retaining the half-shells, in order to allow the movement of the products from said at least one mating centre to said unloading station.

4. A production plant for producing a product comprising at least two half-shells mutually associated so as to form at least one internal containment compartment, comprising:
    at least one loading station for loading at least one half-shell;
    at least one work island which has at least one dispenser of perimetric gasket seals that are suitable to ensure seal-tightness of the product that comprises at least two half-shells;
    at least one storage area for half-shells;
    at least one first grip robot for picking up at least one half-shell from said loading station and delivering the at least one half-shell to said work island and for removal thereof from said work island and delivery to said storage area, said loading station, said work island and said storage area being mutually proximate;

at least one mating centre for mating half-shells, so as to form the product that comprises the at least two half-shells mutually associated; and at least one unloading station for unloading the product;

wherein said loading station comprises at least one movable platform for moving pallets adapted to support trays which contain the half-shells and are mutually stackable; and wherein said loading station has at least one reader, provided along said movable platform, of a transponder that can be fixed to the pallets, for the acquisition of identification data of the trays and for their transmission to a control and management unit, which can be associated functionally with said dispenser and/or with said storage area.

5. The plant according to claim 2, wherein said storage area comprises an automatic magazine for storing the trays in predefined allocation compartments, said automatic magazine comprising automatic means for moving the trays from a loading platform, which faces said work island, to said allocation compartments and from said allocation compartments to an unloading platform, which faces said mating centre.

6. The plant according to claim 2, wherein said work island comprises at least one main worktable, which is controlled by said dispenser and has adapted abutments for an automatic centering of the trays, which are moved by said first grip element, in order to allow the correct placement of the gasket seal.

7. The plant according to claim 1, wherein said work island comprises at least one auxiliary worktable, which is controlled by said dispenser, at least one section of said auxiliary worktable being movable to allow offline loading of the half-shells and their subsequent transfer proximately to said dispenser of perimetric gasket seals made of polymeric material.

8. The plant according to claim 2, comprising two mating centres for mating half-shells and other fitting components that define a finished product, said mating centres being adapted for parallel operation.

9. The plant according to claim 8, wherein each of said mating centres comprises a turntable with manual activation, which has at least two sectors adapted to accommodate temporarily the half-shell supported by the tray, one of said sectors facing said second grip robot, the other one of said sectors facing a manual assembly station, provided with pneumatic equipments for assembling the half-shells and the fitting components.

10. The plant according to claim 9, comprising, downstream of said mating centres, a unit for verifying presence of the fitting components on the finished product.

* * * * *